(12) United States Patent
Willmot

(10) Patent No.: US 6,342,023 B1
(45) Date of Patent: Jan. 29, 2002

(54) GEAR PROFILE FOR ORBITAL GEAR TRANSMISSIONS, AND ORBITAL GEAR TRANSMISSION AND WINCHES UTILIZING ORBITAL GEAR TRANSMISSIONS

(75) Inventor: Eric Paul Willmot, Act (AU)

(73) Assignee: Aimbridge Pty Ltd., Melbourne (AU)

( * ) Notice: Subject to any disclaimer, the term of this patent is extended or adjusted under 35 U.S.C. 154(b) by 0 days.

(21) Appl. No.: 09/462,774

(22) PCT Filed: Jul. 15, 1997

(86) PCT No.: PCT/AU97/00443

§ 371 Date: Jan. 13, 2000

§ 102(e) Date: Jan. 13, 2000

(87) PCT Pub. No.: WO98/03804

PCT Pub. Date: Jan. 29, 1998

(51) Int. Cl.[7] ................................................. F16H 1/34
(52) U.S. Cl. ...................................... 475/180; 475/904
(58) Field of Search ............................... 475/180, 178, 475/162, 904

(56) References Cited

U.S. PATENT DOCUMENTS

| | | | | |
|---|---|---|---|---|
| 1,538,008 A | * | 5/1925 | Sharkey | 475/180 |
| 1,924,794 A | * | 8/1933 | Benson | 475/162 |
| 2,128,815 A | | 8/1938 | Guest et al. | |
| 2,389,728 A | | 11/1945 | Hill | |
| 3,165,943 A | * | 1/1965 | Sundt | 475/180 X |

(List continued on next page.)

FOREIGN PATENT DOCUMENTS

| | | |
|---|---|---|
| AU | 432 884 | 2/1973 |
| AU | A-84 158/82 | 5/1982 |
| AU | A-58996/90 | 1/1991 |
| DE | 26 43 535 | 3/1978 |
| DE | 197 22 399 A1 | 12/1998 |

(List continued on next page.)

OTHER PUBLICATIONS

From Book "A846" (Russian Reference), Theory of Mechanism and Machines (with translation).
From Book "K583" (Russian Reference). Mechanisms (with translation).

*Primary Examiner*—Charles A. Marmor
*Assistant Examiner*—Ankur Parekh
(74) *Attorney, Agent, or Firm*—Burns Doane Swecker & Mathis LLP

(57) ABSTRACT

A gear profile for orbital gear transmission is disclosed in which an outer gear (10) and an inner gear (30) are included. At least one of the gears is constrained for orbital motion to impart rotary motion to the other of the gears. The profile of teeth (34) of inner gear (30) is sinusoidal at least in the vicinity of pitch circle (36) of the gear (30) and the pitch circle (36) coincides with the point of inflection (52) of the sinusoidal profile of the teeth (34). The outer gear (10) has a pitch circle (25) and the point of inflection (19) of the inner gear (30) rolls across the point of the profile of teeth (14) of the outer gear (10) where the pitch circle (25) intersects the profile of the teeth (14). Orbital transmission systems are disclosed in which one or the other of the inner gear (10) or outer gear (30) is mounted on an eccentric (63) which is driven by an input shaft (64). An orbit control plate (67) or regressive gear (110) restrains one of the gears (10 or 30) for orbital motion and the plate (67), or regressive gear (110), has a braking member (80) for fixing the plate (67), or regressive gear (110), stationary. In order to place the transmission into neutral, the brake (80) can be released so that the orbit controle plate (67) is able to rotate rather than to constrain the outer gear (10) or inner gear (30) for orbital motion.

14 Claims, 12 Drawing Sheets

U.S. PATENT DOCUMENTS

| | | | |
|---|---|---|---|
| 4,426,064 A | | 1/1984 | Healy |
| 4,446,752 A | | 5/1984 | Shaffer et al. |
| 4,452,102 A | | 6/1984 | Shaffer |
| 4,640,154 A | | 2/1987 | Osborn |
| 4,760,759 A | * | 8/1988 | Blake ..................... 475/180 X |
| 5,277,672 A | | 1/1994 | Droulon et al. |
| 5,398,904 A | * | 3/1995 | Rees ......................... 475/162 |
| 5,695,425 A | * | 12/1997 | Hashimoto et al. ......... 475/180 |

FOREIGN PATENT DOCUMENTS

| | | |
|---|---|---|
| EP | 0 101 349 A1 | 2/1984 |
| EP | 0 114 561 A1 | 8/1984 |
| EP | 0 286 760 | 10/1988 |
| EP | 0 291 052 A2 | 11/1988 |
| EP | 0 305 535 A1 | 3/1989 |
| EP | 0 548 888 A2 | 6/1993 |
| EP | 0 551 918 A2 | 7/1993 |
| EP | 0 620 383 A2 | 10/1994 |
| FR | 2 366 466 | 4/1978 |
| GB | 1170769 | 11/1969 |
| GB | 2 062 143 A | 5/1981 |
| GB | 2 117 081 A | 10/1983 |
| RU | 94032394 | 7/1996 |
| SU | 1728560 A1 | 4/1992 |
| SU | 1768832 A1 | 10/1992 |
| WO | WO 88/05877 | 8/1988 |

* cited by examiner

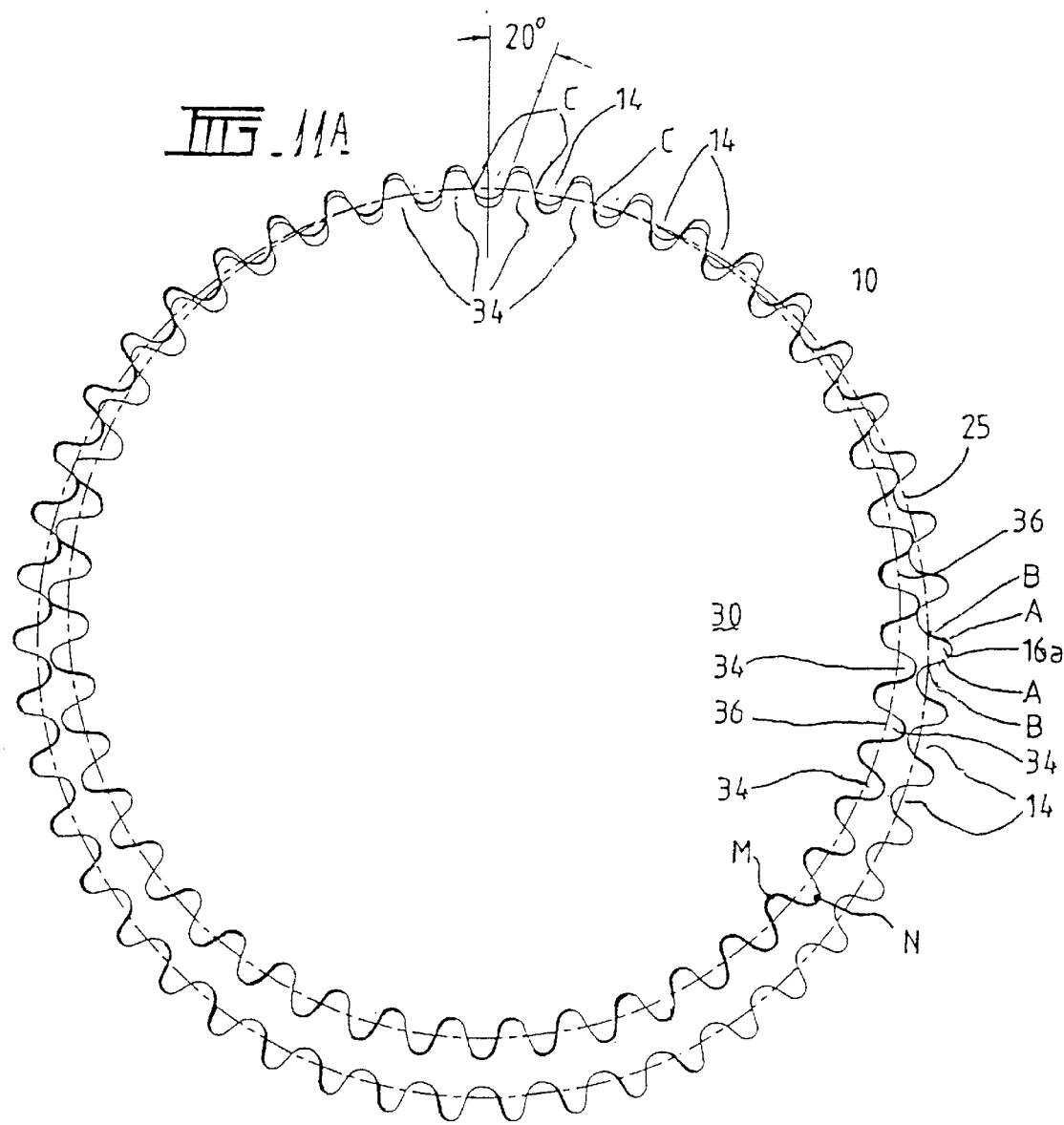

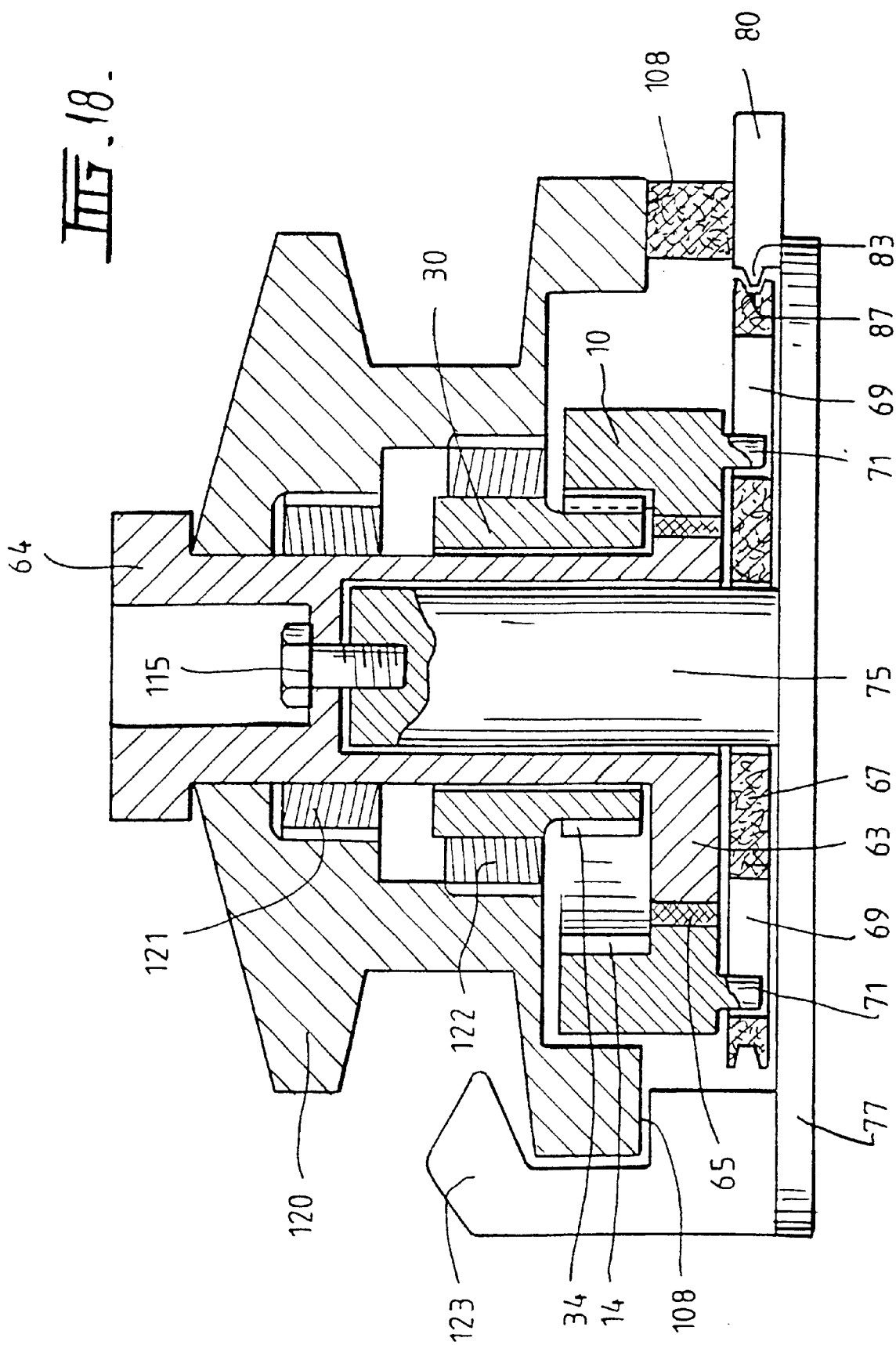

GEAR PROFILE FOR ORBITAL GEAR TRANSMISSIONS, AND ORBITAL GEAR TRANSMISSION AND WINCHES UTILIZING ORBITAL GEAR TRANSMISSIONS

This invention relates to a gear profile for an orbital gear transmission, an orbital gear transmission and winches such as deck winches for yachts and hoists for lifting heavy loads, which include orbital gear transmissions.

The transmission of power involving large torque loads through rotary machines is normally done by means of various gear systems. When large ratio reductions and accompanying torque conversion is required it is common practice to use either spur or planetary gear trains. These involve many elements and tend to be bulky. A worm and a wheel drive provides a simple alternative but because the gear engagement depends on sliding contact, these machines are very inefficient under large loads. Spur and planetary gears use gear teeth which operate in rolling contact by using gear teeth with their surfaces in the form of involutes. This produces highly efficient transmission.

Orbital gear systems, which operate by causing one gear with externally formed teeth to orbit while engaged about another while engaging teeth formed on its inner surface have been known for some time. It has been further known that such gear systems have the potential to provide very great reductions from relatively simple machines.

Unlike spur or epicycle planetary gear systems, where tooth engagement is predicted upon two cylinders rolling together upon their external surfaces, orbital gears cause one cylinder to roll on the inner surface of another. The teeth on spur gears or racks execute small epicycles on the surfaces of the cylinders and hence the engagement process is more or less tangential to the surfaces. This motion generates the involute surfaces of the teeth surfaces.

Orbital gears, on the other hand, execute cycloidal motion against the inner surface of the internal gear, and hence the engagement process is essentially radial and teeth with involute gear forms produce only sliding contact with high friction under load. Up until now this has made orbital gears little more than engineering curiosities.

In an attempt to make use of other important features of orbital gears some enterprises have tried to use simple cycloidal teeth forms. This form still produces sliding contact and although the incorporation of and array of bearings reduces this frictional problem it vastly increases the size and complexity of such machines which severely limits their use.

Clearly therefore a need exists to develop a new gear from which allows orbital gear systems to employ only rolling tooth contact while maintaining the fundamental principle of rigid body gear contact to ensure that their pitch circle roll together without slippage.

The first aspect of the invention may also be said to reside in an orbital gear system, including:
  an inner gear and an outer gear;
  the inner gear having a plurality of external teeth, the plurality of external teeth having a contact surface and a opposite surface, the inner gear having a pitch circle, the contact surface having a point of inflection located on the pitch circle of the first gear;
  the outer gear having a plurality of internal teeth for engagement with the external teeth of the inner gear, the internal teeth having a contact surface for engaging the contact surface of the external teeth of the inner gear, the outer gear having a pitch circle; and
  wherein, when the inner gear and outer gear are assembled for transmission of power from one of the gears to the other of the gears, the inner and outer gear undergo substatially radial engagement and point contact with the point of inflection of the external teeth engaging and rolling across an only point on the contact surface of the internal gear substantially where the pitch circle of the outer gear intersects the contact surface of the outer gear.

The first aspect of the invention also provides an orbital gear transmission including the orbital gear system.

The first aspect of the invention also provides a rotary transmission mechanism, including:
  a first body having contact elements;
  a second body having contact elements for engaging the contact elements of the first body and transferring rotary motion from the first body to the second body;
  one of the first body or second body being arranged for orbital motion relative to the other of the first or second body; and
  the elements of the first body and second body in contact with one another, when rotary motion is transferred, execute cupsoid cycloidal motion with respect to each other and engage radially by a rocking motion between the elements with one of the elements rocking on substantially a point of a surface of the other of the elements.

The first aspect of the present invention provides a gear profile which greatly improves the performance of orbital gear systems and orbital gear transmissions. The gear, system and transmission of this aspect of the invention abides by rolling gear principles but prevents slippage between pitch circles of the inner and outer gears. The rolling contact occurs at a point, for example approximately 4% of the cycle of each gear, but with orbital gear systems more gears are in engagement with one another. The present invention particularly enables orbital gears having pitch circles of very similar diameter. Since the contact occurs the pitch circles of the inner and outer gears very smooth operation of the gears. The sinusoid which forms part of the contact surface of the inner gear is related to two parameters of the system, namely the eccentricity of the orbital system and the diameter of the pitch circle for a given number of teeth. The gears may be made by sophisticated machines such as laser cutters or wire cutters but can also be made by shapers such as a Fellows shaper and tools such as a Hobb tool can be constructed on the principles for manufacture of such gears. Orbital gear systems using the teeth profile according to this aspect of the invention also enables very low reductions from simple machines and the ability to stop under load and remains stationary until the cycle is activated by the input to the transmission. Furthermore, the transmission is easily disengaged by release of an orbit control mechanism in the orbital system to effectively place the transmission into neutral.

Preferably the contact surface has a sinusoidal profile with the sinusoidal profile being defined by the following equation:

$$y=f(D)\text{Sin}\{\pi WD\theta g(\epsilon)\}$$

where D is the diameter of the pitch circle
  W is tooth width
  $\epsilon$ is eccentricity
  $\theta$ angular displacement
  within the constraint the D of the inner gear is more than two thirds the D of the outer gear.

Preferably the external teeth of the inner gear are truncated having a generally flat outermost surface and the sinusoidal portion of the contact surface extends from a point radially inwardly of the pitch circle of the gear to the truncated surface.

Preferably the opposite surface of the external teeth are also provided with a sinusoidal profile along at least part of the length of the opposite surface. The sinusoidal profile of the opposite surface having a point of inflection located on the pitch circle of the gear, so that the gear can operate in both forward and reverse directions with the contact surface making contact with the internal teeth of the outer gear in one direction and the opposite surface effectively becoming the contact surface for rotation in the opposite direction.

Preferably the contact and opposite surfaces of the external teeth are a mirror image with respect to one another.

Preferably the contact surface of the internal gears is an inclined flat surface which extends from a radially outer point to the point where the pitch circle of the outer gear intersects with the contact surface.

Preferably the angle of the flat surface with respect to the radius of the outer gear is determined by the derivative of the sinusoid forming the sinusoidal profile of the external teeth at the point of inflection of the sinusoidal profile.

Preferably the contact surface of the internal teeth extends radially inwardly from the point of intersection of the contact surface and the pitch circle of the outer gear to a radially most inner point of the internal teeth.

Preferably the internal teeth have a opposite surface which is a mirror image of the contact surface with the opposite surface becoming the contact surface in reverse motion of the gear system.

A second aspect of the invention relates to an orbital gear transmission.

This aspect of the invention provides an orbital gear transmission, including:

an inner gear having a plurality of external teeth;

an outer gear having a plurality of internal teeth for engagement with the external teeth of the inner gear;

one of the inner or outer gears being mounted on an eccentric member;

orbit control means for engaging the inner or outer gear which is mounted on the eccentric member so as to control movement of the inner or outer gear mounted on the eccentric member to undergo orbital motion;

brake means for engaging the orbit control means and maintaining the orbit control means stationary so as to control orbital motion of the inner or outer gear mounted on the eccentric and wherein the brake means; and means for releasing the brake to, in turn, release the orbit control means so that the orbit control means no longer controls orbital motion so the inner or outer gear can freely rotate to place the transmission into neutral.

This aspect of the invention provides a transmission for machines such as winches including hoists and deck winches for yachts which provide simple machines providing high efficiency and very low reductions.

The orbital control means may comprise an orbital control plate having openings or pins which engage with respectively pins or openings on the inner or outer gear which is mounted on the eccentric.

Preferably the inner and outer gears are configured according to the first aspect of the invention described above.

In other embodiments of the invention, the orbital control means may comprise a regressive control gear having gear teeth which engage control gear teeth provided on the inner or outer gear mounted on the eccentric. The regressive control gear enables regressive motion of the inner or outer gear which is mounted on the eccentric so that extremely low reductions can be provided.

Preferably the transmission according to the second aspect of the invention is provided in a winch.

In one embodiment, the winch is in the form of a hoist having an input pulley mounted on an input shaft which is coupled to the eccentric and an output pulley is coupled to the inner or outer gear which is not mounted on the eccentric so that drive is transmitted from the input pulley to the input shaft to the eccentric, to the inner or outer gear mounted on the eccentric and then to the inner or outer gear which is not mounted on the eccentric and then to the output pulley.

This aspect of the invention which is used in hoists has particular advantages and, in particular, that the orbital transmission can remain stationary when the input shaft is stopped by ceasing to pull on a chain or cable coupled to the input pulley so that the transmission and therefore the hoist will remain in a stationary position even when supporting a load until the chain on the input pulley is again pulled to activate the input and therefore the orbital transmission. By releasing the braking means after load is removed, the orbital transmission could be placed in neutral to thereby release the hoist.

In another embodiment, the orbital gear transmission may be included in a deck winch for a yacht, the eccentric being coupled to an input shaft which is rotated by a winch handle, the deck winch having a drum for receiving a rope to be drawn in or released by the winch, the drum being coupled to the input shaft by a first ratchet so that upon rotation of the input shaft in one direction, drive is transmitted via the ratchet to the drum to rotate the drum with a 1:1 gear ratio, the inner or outer gear which is not mounted on the eccentric member also being coupled to the drum by a second ratchet which freewheels when the input shaft is rotated in the first direction but which engages when the input shaft is rotated in the opposite direction so that drive is transmitted via the orbital gear transmission and the second ratchet to the drum to rotate the drum with a drive ratio according to the drive ratio of the orbital transmission, and with the first ratchet freewheeling when the input shaft is rotated in the opposite direction.

Thus, according to this aspect of the invention, the winch drum is always rotated in the same direction notwithstanding rotation of the input shaft in opposite directions.

Preferably the input shaft is mounted on a mast of the input shaft having a hollow for receiving the mast.

Once again, in this embodiment of the invention, the brake means can be released so as to release the orbital control means to place the transmission in neutral and thereby release the winch. Thus, if it is necessary to quickly release the deck winch so as to release a sail, the brake mechanism can simply be released to in turn release the orbital control means to place the transmission into neutral so that the drum can freewheel.

The invention also provides an orbital gear transmission including:

a first outer gear having a plurality of internal teeth;

a second outer gear having a plurality of internal teeth;

an input having an eccentric;

a first inner gear, having a plurality of external teeth, on the eccentric, the teeth of the first inner gear engaging the teeth of the first outer gear;

a second inner gear, having a plurality of external teeth, on the eccentric, the teeth of the second inner gear engaging the teeth of the second outer gear; and an output coupled to the second outer gear.

Preferred embodiments of the invention will be described, by way of example, with reference to the accompanying drawings, in which:

FIG. 11A is a diagram showing teeth profile according to a second embodiment of the invention;

FIG. 18 shows a deck winch utilising the transmission of FIGS. 14 and 15.

FIG. 1 shows a gear profile of an outer gear of an orbital gear system and FIG. 2 shows a gear profile of the inner gear of the orbital gear system.

Figure 1:
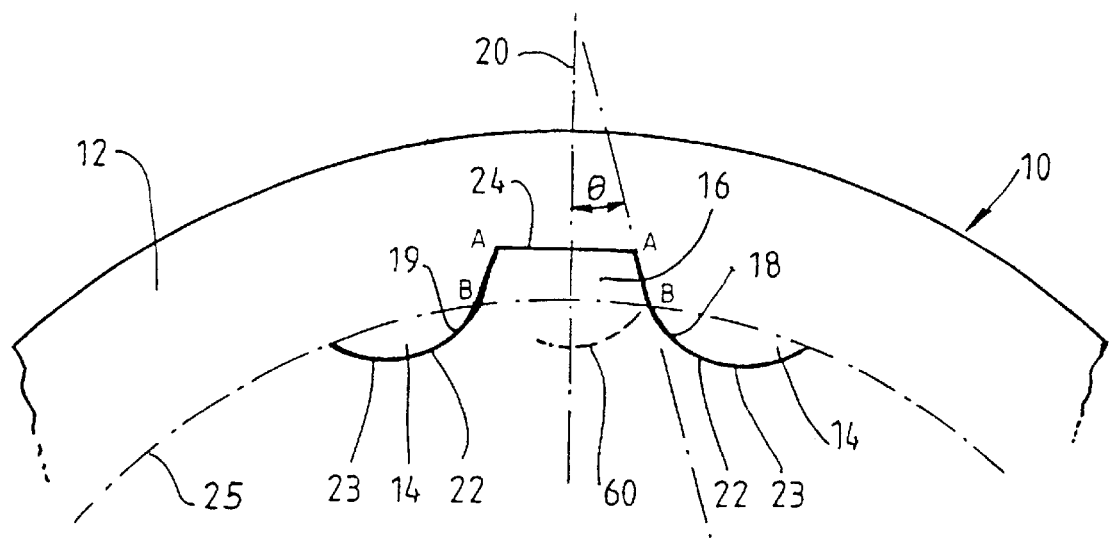
FIG. 1 is a diagram illustrating a tooth profile of an outer gear of an orbital gear system.

With reference to FIG. 1, outer gear 10 has a gear body 12 generally in the form of a ring. The ring 12 has internal teeth 14 (only two of which are shown). A space 16 is provided between adjacent teeth 14.

The teeth 14 have a contact surface 18 and a opposite surface 19. For ease of illustrations the opposite surface 19 of one tooth 14 is shown along with the contact surface 18 of the adjacent tooth 14.

As can be clearly seen in FIG. 1, the surfaces 18 and 19 of adjacent teeth 14 are a mirror image of one another about radial line 20. The surfaces 18 and 19 of the same tooth 14 are also a mirror image about a radial line (not shown) through the tooth 14. The surfaces 18 and 19 of each tooth 14 generally meet at an innermost point 22 on clearance surface 23 of each tooth 14.

The surfaces 18 and 19 of adjacent teeth 14 extend outwardly in the radial direction and terminate at flat surface 24 which defines the radially outer point of the space 16 between teeth 14.

Figure 2:
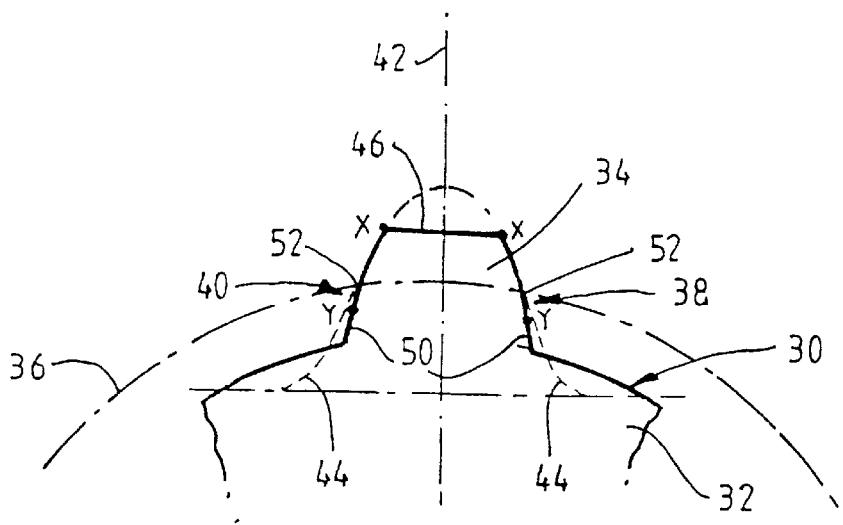
FIG. 2 is a diagram illustrating the tooth profile of an inner gear of an orbital gear system.

The reference to a opposite surface 18 and a contact surface 19 assumes movement of the gear 10 so that the surface 18 will engage teeth of the gears shown in FIG. 2. However, if the gear 12 moves in the opposite direction, then the opposite surface 19 of each tooth 14 obviously becomes the contact surface and the surface 18 will become the opposite surface.

With reference to FIG. 2, inner gear 30 is shown which has a body 32 which may generally be ring-shaped having a central opening for location on a shaft. The body 30 is provided with teeth 34 (only one shown). The gear 30 has a pitch circle 36, the teeth 34 have a contact surface 38 (which will be the surface which contacts the teeth 14 of the gear 10) and an opposite surface 40. The contact surface 38 and opposite surface 40 are a mirror image of one another about radial line 42. The contact surface 38 and opposite surface 40 are generally of sinusoidal shape as shown by the sinusoid 44 shown in dotted lines. Indeed, the portion of the contact surface 38 and opposite surface 40 between points X and Y is sinusoidal. At points X, the teeth 14 are truncated to provide a radially outer flat surface 46. The profile of the teeth 34 inwardly of the points Y tapers inwardly slightly from the sinusoidal line 44 as shown by reference numerals 50 to provide clearance. The sinusoidal profiles between the points X and Y have points of inflection 52 which are provided on the pitch circle 36 of the gear 30.

Referring back to FIG. 1, the flat surfaces of the contact surface 18 and opposite surface 19 between the points A and B of the teeth 14 are inclined or angled as shown by the angle θ with respect to the radial line 20. The angle θ is determined by the derivative of the sinusoidal profile between the points X and Y of the teeth 34 at the point of inflection 52.

As is apparent from FIG. 1, the straight section of the teeth 14 between the points A and B merges into a clearance surface 23 which is of arcuate profile as clearly shown in FIG. 1. The profile provides a clearance path for the teeth 34 as will be described in detail hereinafter and in the preferred embodiment, the profile basically coincides with a cycloidal path shown by dotted line 60 at which the point B would follow as the gear 10 undergoes orbital motion. The points B are therefore at the cusp of the cycloidal paths 60 and located on the pitch circle 25 of the gear 10. However, the exact configuration of the teeth 14 between the points B can be arbitrarily selected consistent with providing sufficient tooth strength and also clearance for the tooth 34.

Similarly, the exact position of the flat surface 24 of the gear 10 and the flat surface 46 of the teeth 34 is also somewhat arbitrary and can be selected so as to provide adequate clearance. Once again, the exact profile of the surfaces 24 and 46 is not important although generally flat surfaces as shown are preferred.

Whilst it is most preferred that the profile between the points A and B be flat as previously described, it would be possible to provide a sinusoidal profile between the points A and B on the teeth 14. However, this may necessitate a change in the sinusoidal function which defines the surface profile between the points X and Y of the teeth 14 to compensate for the sinusoid applied to the teeth 14.

Figure 3:
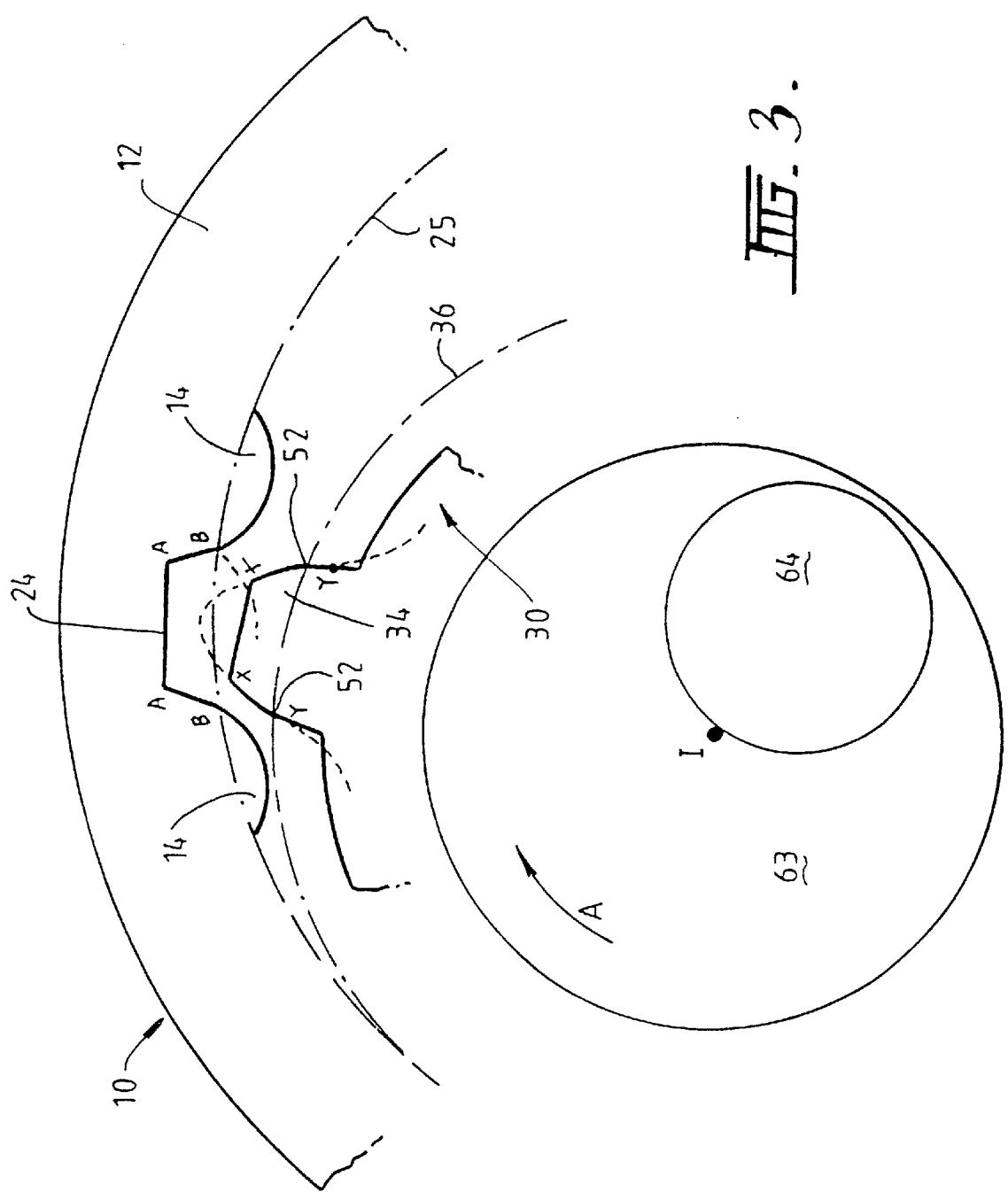
FIG. 3 shows gears of FIGS. 1 and 2 in an assembled position for rotation for illustrating the interaction between the gear profiles of the gears of FIGS. 1 and 2.

FIG. 3 shows the gears 10 and 30 mounted for engagement with one another. In the embodiment shown in FIG. 3, the gear 10 is mounted on an eccentric 63 which is in turn coupled to an input shaft 64. The gear 30 is restrained to undergo orbital motion by an orbital control means (which will be described in more detail hereinafter) which may be an orbit control plate, orbital control gear or the like. It should be understood that in other embodiments of the invention, it would be possible to mount the gear 30 for orbital motion rather than the gear 10. Embodiments showing this arrangement will be described hereinafter. Generally the gear which is mounted on the eccentric 63 to undergo orbital motion is an input gear of the gear system and the other gear is the output gear for providing output transmission. Arrangements in which the inner gear is mounted for orbital motion will generally result in the outer gear rotating in the same direction as the input shaft which supplies drive to the inner gear whereas mounting the outer gear to undergo orbital rotation and taking output from the inner gear results in the inner gear undergoing rotation in the reverse direction to the input shaft. This phenomenon can be taken advantage of in specific embodiments using the orbital gear transmission and also can be used to provide a reverse gear.

Figure 4:
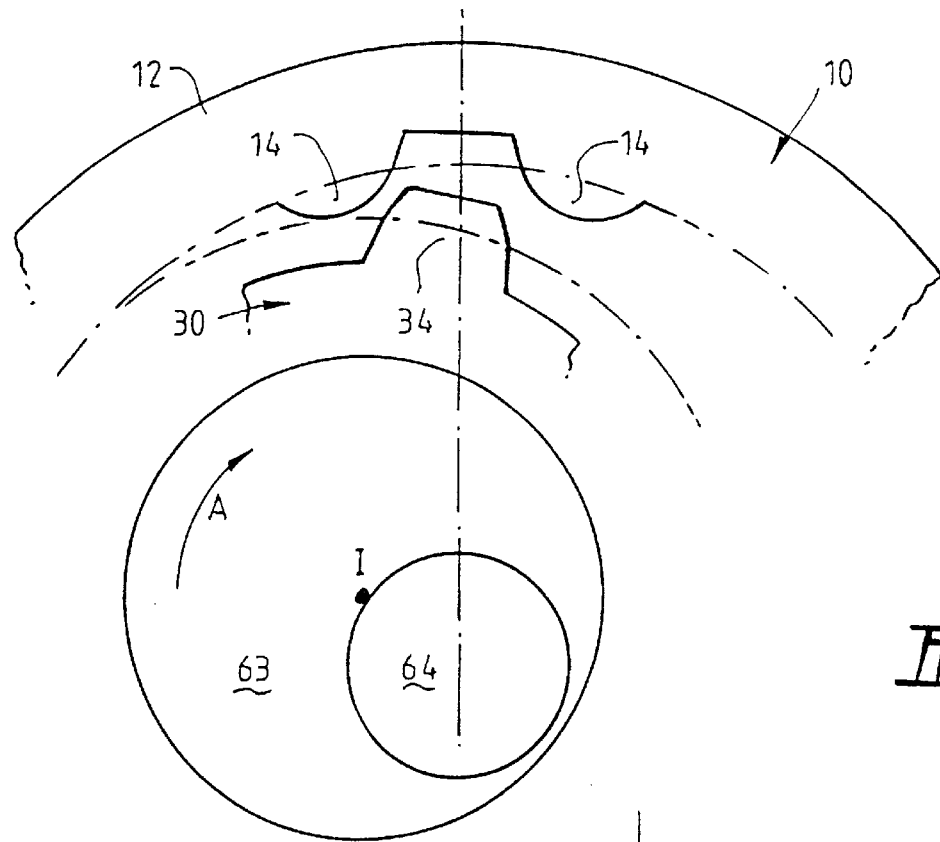
FIGS. 4, 5, 6, 7, 8, 9, 10 and 11 are diagrams showing the gears of FIG. 3 in various positions as drive is transmitted from one of the gears to another of the gears.

FIG. 4 is a view similar to FIG. 3 showing the teeth without the designation of the sinusoid shown by dotted line 44, the cycloidal path shown by dotted line 60. The profile of the teeth can therefore be more clearly seen in FIG. 4.

With reference to FIG. 4, the teeth 34 and 14 are shown in a disengaged position with the outer gear 10 undergoing orbital motion due to rotation of the input shaft 64 and eccentric 63 in the direction of arrow A in FIGS. 3 and 4. As the gear 10 continues to orbit contact surface 18 of tooth 14 moves towards tooth 34 of the gear 30.

Figure 5:
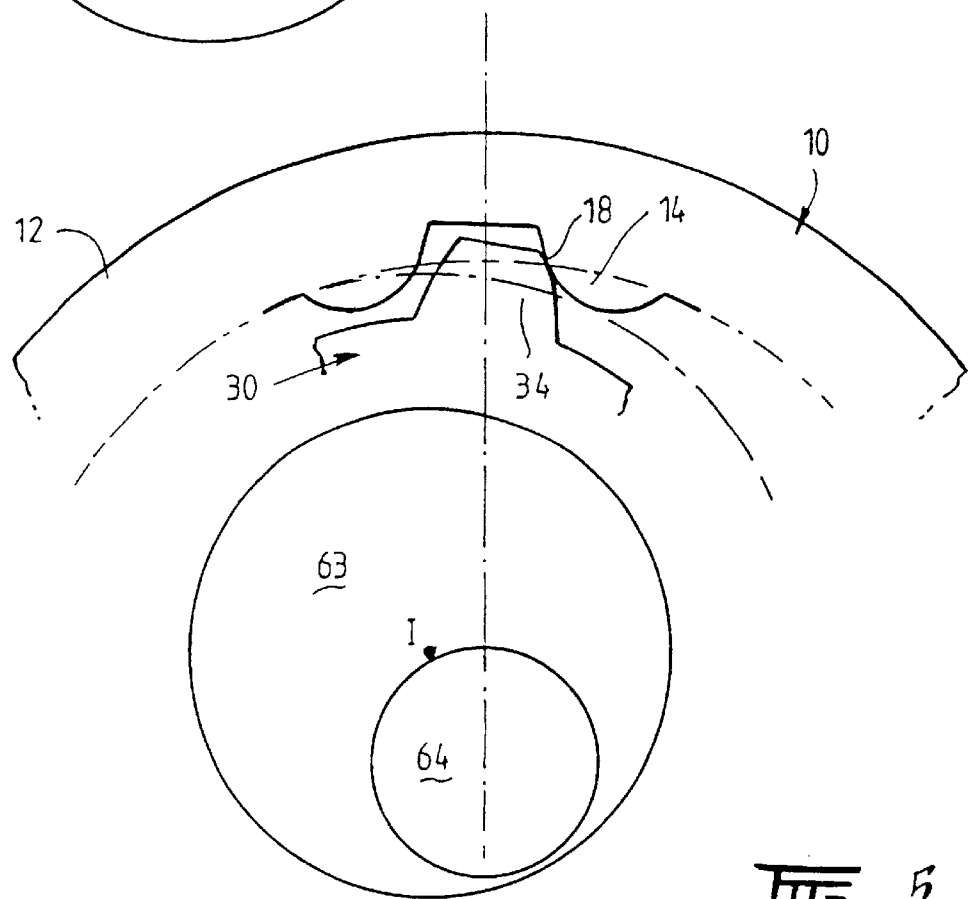

The point marked I on the input shaft 64 in FIGS. 4 and 5 shows the position of the orbit for reference purposes.

Figure 6:
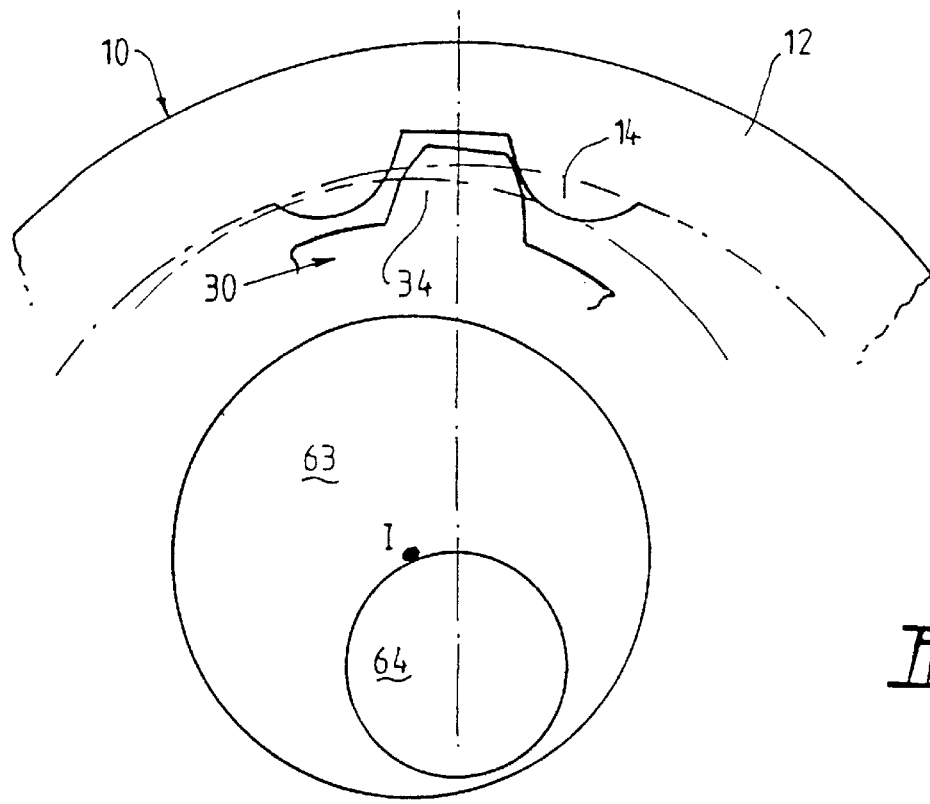

As the orbit continues, the gears move into position shown in FIG. 6 where the teeth 14 and 34 are almost in contact, possibly only being separated by an oil film with the teeth 34 sliding relative to the tooth 14 on the oil film, but not making contact with the tooth 14.

Figure 7:
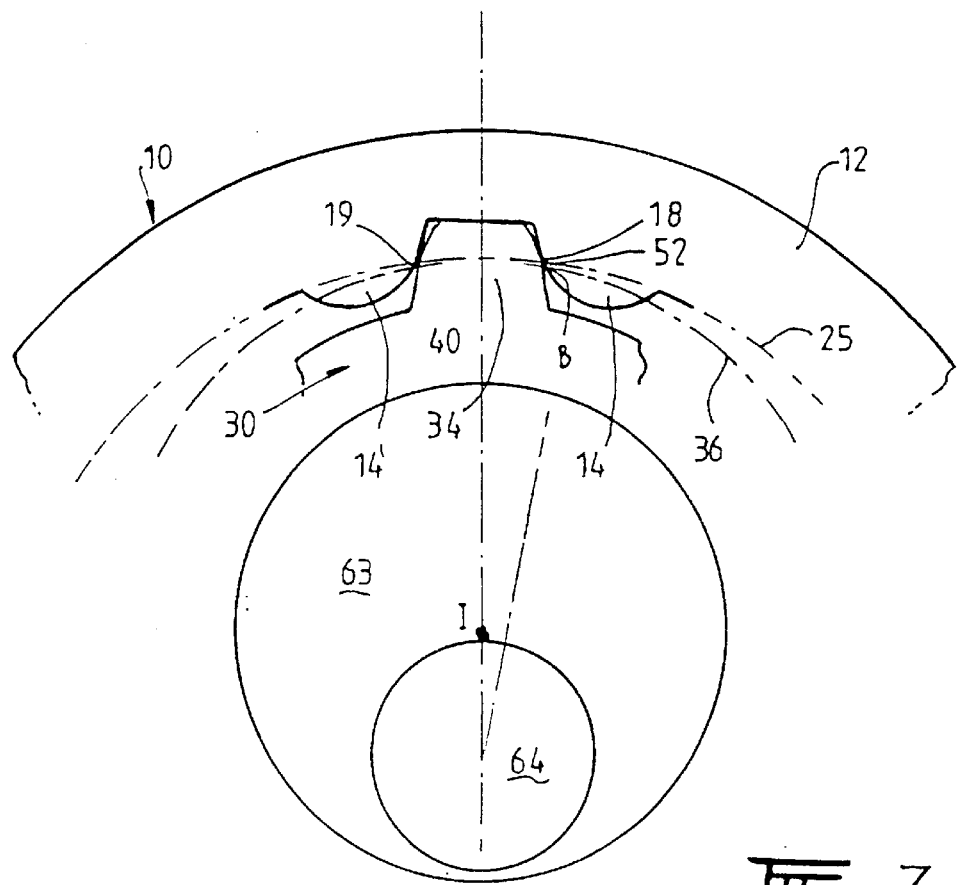

At the position shown in FIG. 7, the teeth 34 and 14 make contact with the point of inflection 52 rolling across the point B of the tooth 14. As is clearly shown in FIG. 7, the two pitch circles 25 and 36 of the gears 10 and 30 coincide with one another at the point of contact B and drive is transmitted from the gear 10 which is undergoing orbital motion to the gear 30 so as to rotate the gear 30 about its central axis.

The surface 19 of the adjacent tooth labelled 14' in FIG. 7 does not make contact with the opposite surface 40 of the tooth 34. A certain amount of backlash may be provided by providing a spacing of, for example, half a millimeter between the opposite surfaces 19 and 40. However, in some embodiments, there could be momentary contact between the opposite surfaces 19 and 14 if desired.

Figure 8:
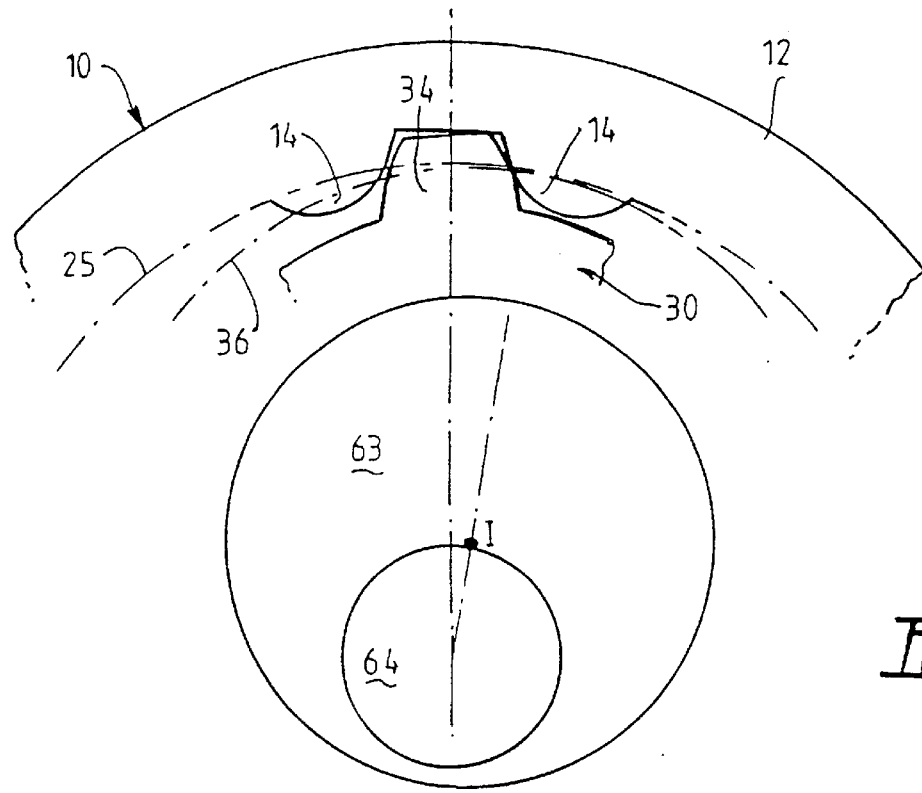

In view of the gear profiles previously described with reference to FIG. 1, the point 52 rolls across the point B as drive is transmitted from the gear 14 to the gear 34. Rolling contact occurs for approximately 4° of the rotation of the gear 30 and as is shown in FIG. 8, the gear 34 then begins to disengage from the gear 14.

It should be understood that whilst only a single engagement between two gears 34 and 14 is shown in the figures described to date, a number of gears will be in engagement with one another due to the orbital nature of the gear 10 with respect to the gear 30. As the tooth 34 begins to disengage from the tooth 14 as shown in FIG. 8, load is effectively transferred to another pair of teeth 14 and 34 to continue supplying drive from the gear 10 to the gear 30 to cause the gear 30 to rotate about its central axis.

Figure 9:
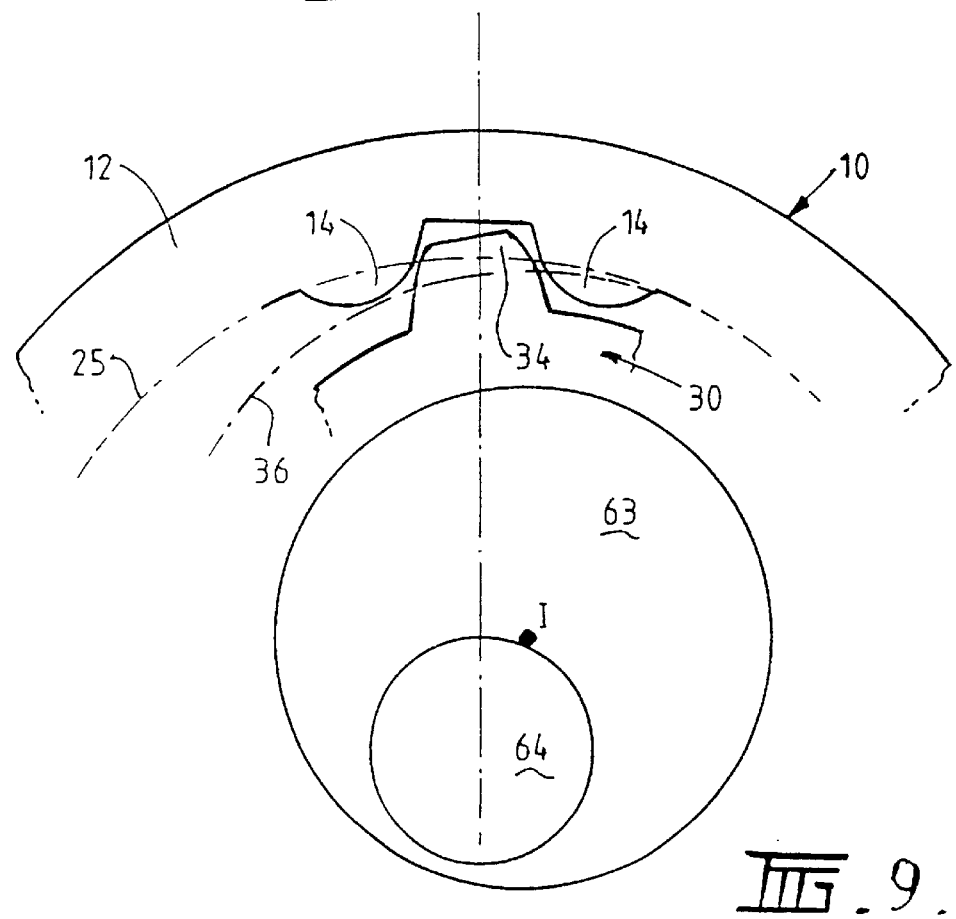

FIG. 9 shows the gears clearly disengaged from one another.

Figure 10:
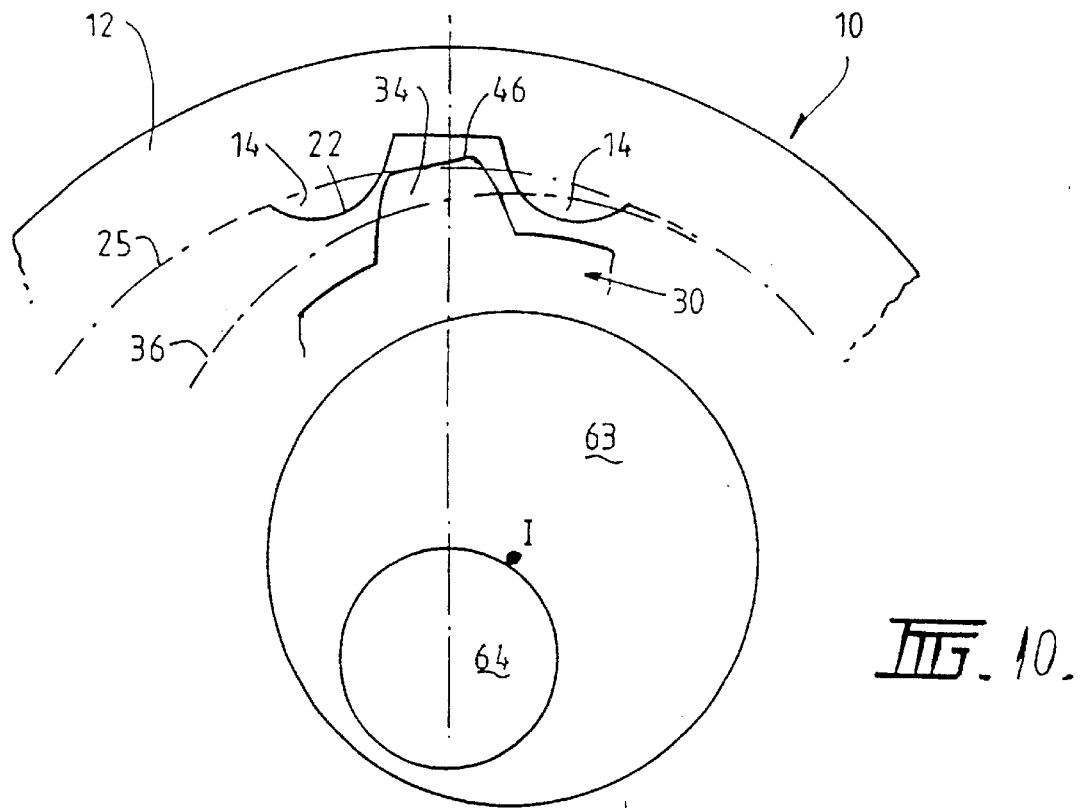
Figure 11:
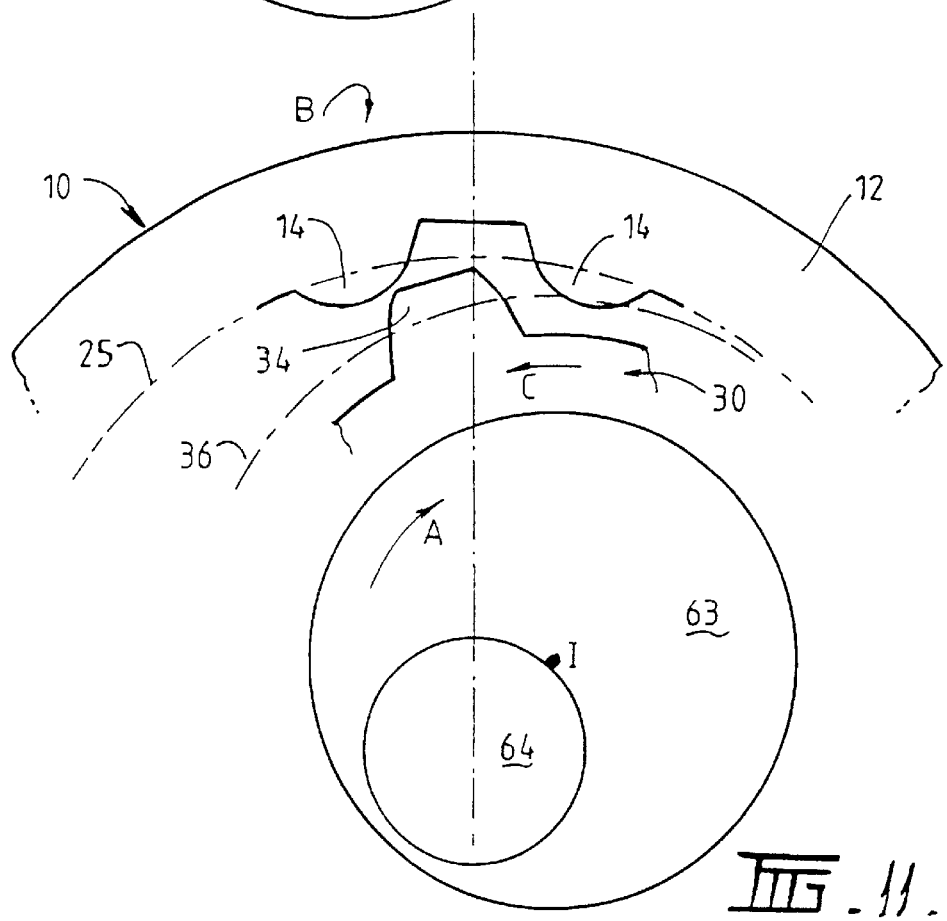

FIG. 10 shows the flat surface 46 of the gear 34 travelling past the clearance surface 23 of an adjacent gear 14 and just clearing that gear and FIG. 11 shows the teeth 14 and 34 clearly disengaged from one another as the orbital movement of the gear 10 progresses.

Thus, as input shaft 64 and eccentric 63 rotate in the direction of arrow A shown in FIG. 11, gear 10 generally orbits in the direction of arrow B so as to contact teeth 14 of the gear 30 to cause the gear 13 to rotate in the direction of arrow C opposite to the direction of rotation of the input shaft 64 and eccentric 63 shown by arrow A.

FIG. 11A shows a diagram illustrating a complete gear profile for an outer orbiting gear and an inner rotating output gear. Like reference numerals indicate like parts to those in the embodiment of FIGS. 1 to 11.

In this embodiment of the invention, the gear profile of both the inner gear 30 and outer gear 10 are curved rather than being truncated as in the embodiment of FIGS. 1 to 11. The profile of the teeth 34 of the inner gear are a complete sinusoid about the pitch circle 36. For example, the curve between the points M and N is a complete sinusoid. The profile of the teeth 14 of the outer gear embody the straight section between the points A and B as per the embodiment of FIGS. 1 to 11 with the clearance surface 23 being curved in a similar fashion to the embodiment of FIGS. 1 and 11. The space 16 between the teeth 14 of the outer gear 10 include a curved recess 16a as distinct from the truncated recess 16 of the embodiments of FIGS. 1 and 11 so as to accommodate the curved sinusoid of the teeth 34.

FIG. 11A shows contact C taking place between four pairs of teeth 14, 34 with the contact taking place by rolling or rocking motion substantially at the location where the pitch circles 25 and 36 coincide with one another. As previously explained, the point of inflection of the sinusoidal profile of the teeth 34 basically rolls over the intersection of the pitch circle 25 with the profile of the teeth 14. In the embodiments shown, four sets of teeth are in contact at various locations of rolling motion of the point of inflection of the sinusoidal profile of the tooth 34 across the intersection of the pitch circle 25 and profile of the teeth 14. Contact of each pair of teeth 34 and 14 remains for approximately 4° of the rotation of the gear 30. Thus, for example the pair of teeth 34 and 14 to the right in FIG. 11A may be just beginning contact with the point of inflection of the tooth 34 being slightly below the pitch circle 25 of the tooth 14 ready to roll across the pitch circle 25. The point of contact C of the pair of teeth 34 and 14 on the left in FIG. 11A may have completed the rolling motion across the pitch circle 25 and the contact between these two teeth is just about ready to discontinue.

Computerised testing of the gear profiles according to FIG. 11A show a comparative PCD of 93%, a PCD slip of 0, radial motion of 0.007 mm, interference of 0 and a pressure angle of 20°.

Figure 12:
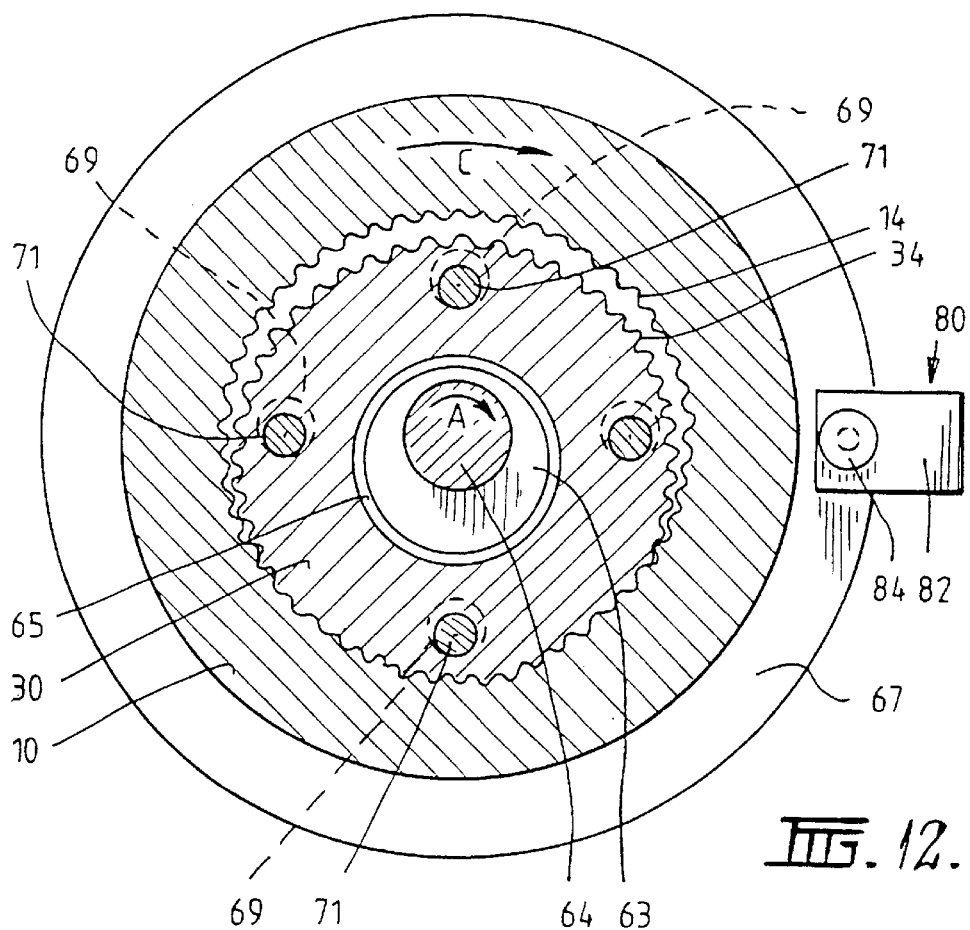
FIG. 12 is a plan view of a transmission embodying the invention.
Figure 13:
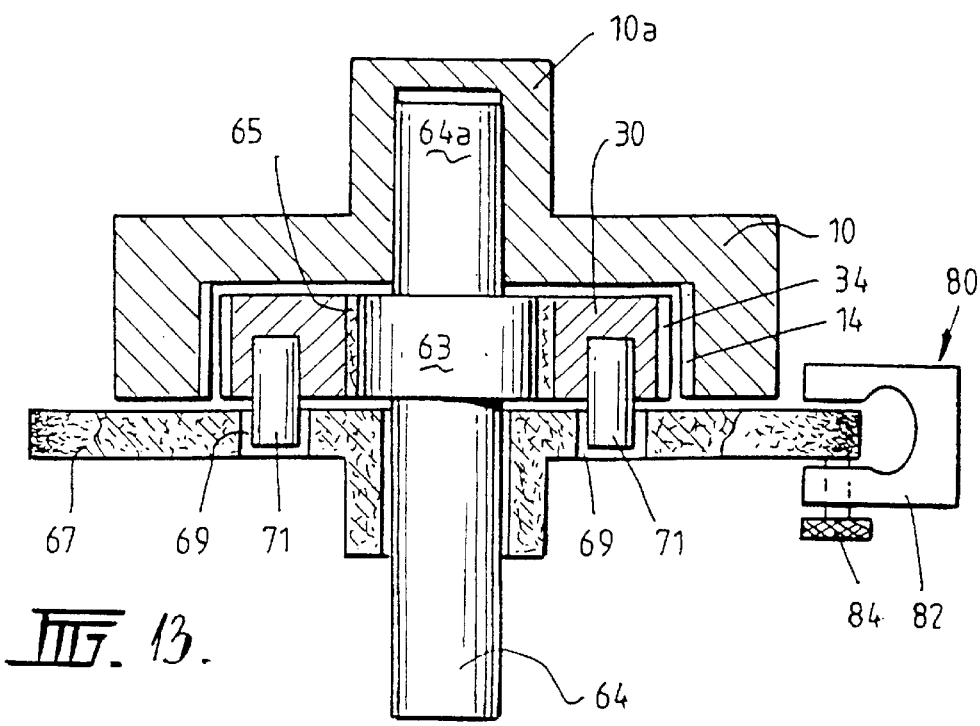
FIG. 13 is a cross-sectional view through the transmission of FIG. 12.

FIGS. 12 and 13 show a first embodiment of an orbital gear transmission which use teeth profile as per the embodiment previously described.

Like reference numerals will be used in the embodiment of FIGS. 12 and 13 as they have been used in the description of the gears according to FIGS. 1 to 11.

An input shaft 64 is provided with an integral eccentric 63. In this embodiment, the inner gear 30 is mounted on the eccentric 63, but as will be disclosed hereinafter with reference to other embodiments, the outer gear 10 could be provided on the eccentric 63 as is mentioned above. A bearing 65 is provided between the eccentric 63 and the gear 30. An orbit control plate 67 is mounted below the gear 30 and includes four circular openings 69. The gear 30 is provided with four pins 71 which project into the openings 69 and the plate 67 is fixed stationary by a brake mechanism 80 which may include a fixed block 82 and a screw member 84 which can be screwed into the block 82 to clamp onto the plate 67 to thereby hold the plate 67 stationary with respect to the block 82. The brake mechanism 80 shown in FIGS. 12 and 13 is schematic only and other forms of brake mechanism will be readily apparent for selectively holding the plate 67 stationary and releasing the plate as desired.

Rotation of the input shaft 64 will cause the eccentric 63 to rotate which will in turn drag the gear 30 in orbital fashion by virtue of engagement of the pins 71 in the opening 69 so that the pins 71 effectively slide on one half of the inner surface of the respective openings 69 to thereby restrain the motion of the gear 30 to an orbital motion generally in the same direction as the direction of rotation of the input shaft 64 and eccentric 63 (such as that shown by arrow A in FIG. 12).

As the gear 30 orbits the teeth 34 of the gear 30 will engage with the teeth 14 of the gear 10 so as to cause the gear 10 to rotate in the direction of arrow C in FIG. 12 (which in the arrangement shown in FIGS. 12 and 13 is the same as the direction of arrow A).

Rotation of the outer gear 10 provides output power and can be taken off, for example, from integral sleeve 10a of the gear 10 which is supported on extension 64a of the input shaft 64 so as to provide output rotary power with a drive ratio which is set by the orbital transmission provided by the gears 30 and 10.

In order to release the transmission (that is place the transmission into neutral) the brake 80 is simply released so that the plate 67 is released to thereby cause the plate 67 to merely rotate with the eccentric 63 and gear 30 so that the transmission effectively freewheels without any drive being transmitted to the gear 10. Release of the plate 67 effectively releases the gear 30 from the restrained orbital motion so that the gear 30 rotates with the eccentric 30 with the pins 71 simply driving the released plate 67 so that the plate 67 rotates with the gear 30 and eccentric 63.

Figure 14:
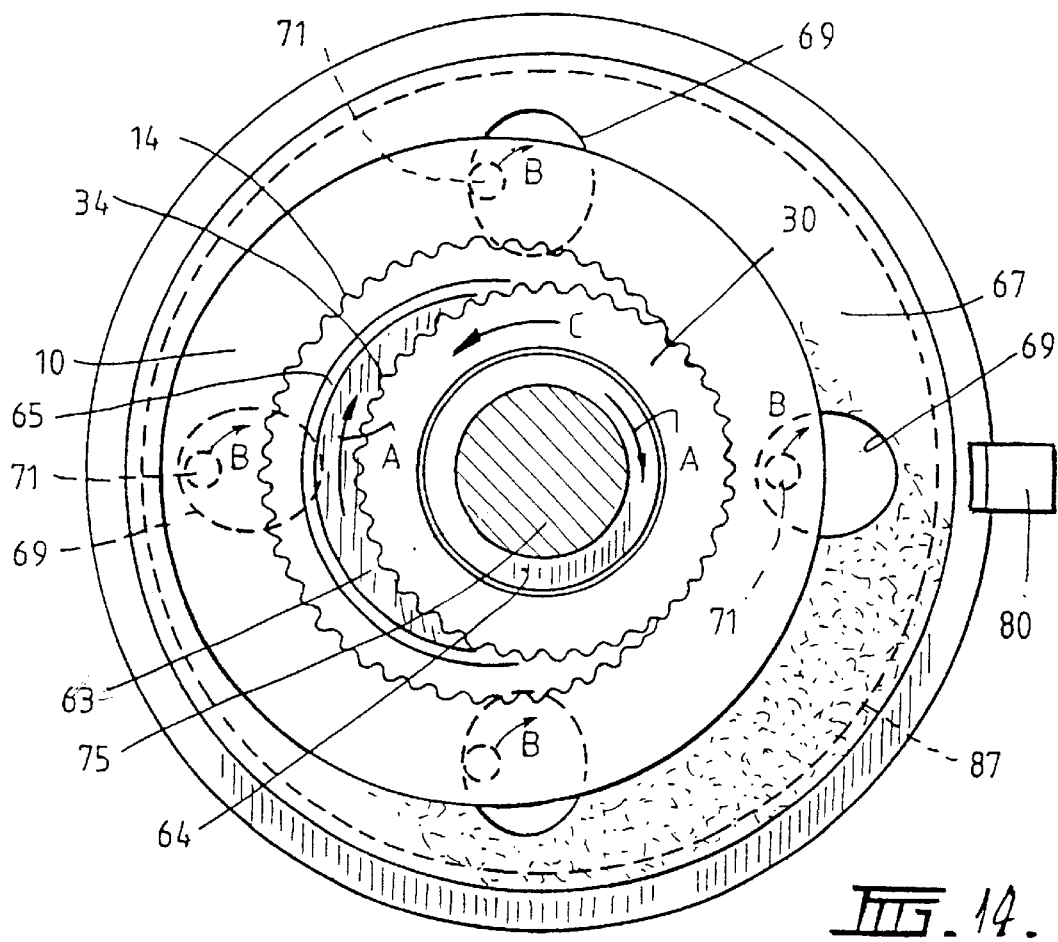
FIG. 14 is a plan view of a transmission according to a further embodiment of the invention.
Figure 15:
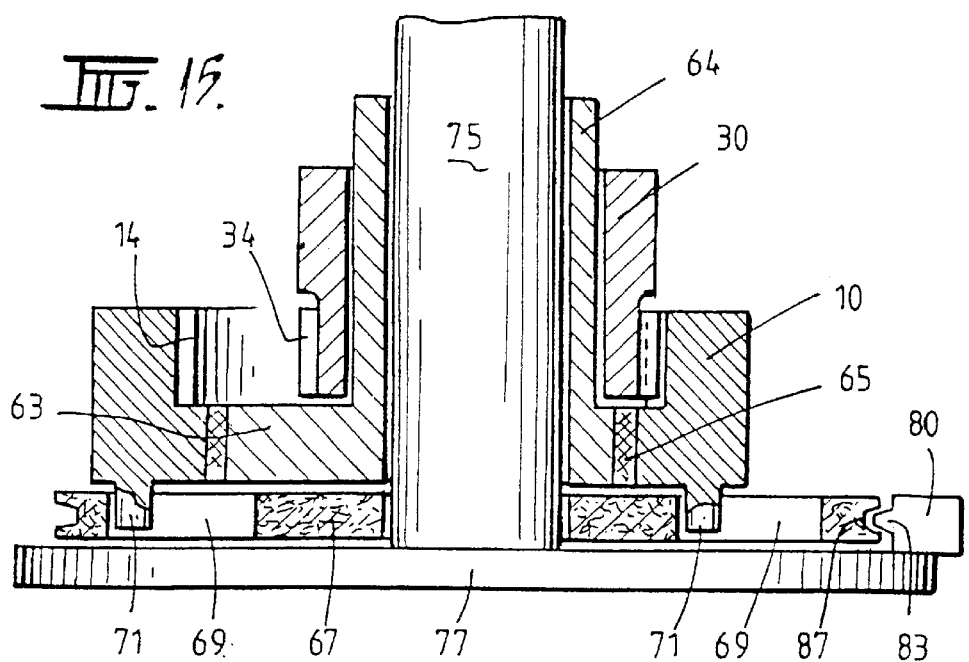
FIG. 15 is a cross-sectional view through the transmission of FIG. 14.

FIGS. 14 and 15 show a further embodiment of the invention which is similar to the arrangement described with reference to FIGS. 1 to 11 in which the outer gear 10 is restrained for orbital motion and the inner gear 30 is used to provide output power take off.

In this embodiment, a mast 75 is provided on a base plate 77. Input shaft 64 is hollow and locates over mast 75. The input shaft 64 carries integral eccentric 63 which in turn mounts outer gear 10 via bearing 65. Inner gear 30 is provided about input shaft 64 for rotation relative to the input shaft 64.

Orbit control plate 67 is provided with four openings 69 and is provided on the base plate 77 and has a brake 80, which in the arrangement shown in FIGS. 14 and 15, is provided with a projection 83 which can locate in a groove 87 provided in the outer periphery of the plate 67 to thereby lock the plate 67 fixed stationary.

In this embodiment, the outer gear 10 is provided with the pin 71 which locate in the hole 69 in the orbit control plate 67 so that when the input shaft 64 and eccentrics 63 are rotated, the gear 10 is restrained to undergo orbital motion by virtue of the pins 71 being retained within the opening 69.

The orbital motion of the outer gear 10 in the direction of arrows B shown in FIG. 14 causes inner gear 10 to rotate in the opposite direction C to the input shown by arrow A as has been described in more detail with reference to FIGS. 1 to 11.

Thus, by rotating the input shaft 64 in the direction of arrow A, drive can be provided to the gear 30 in the opposition direction as shown by arrow C with a ratio set by the orbital transmission provided by the gears 30 and 10.

In this embodiment, the gear 30 is provided with an upper portion 30a from which output drive can be taken if desired.

Figure 16:
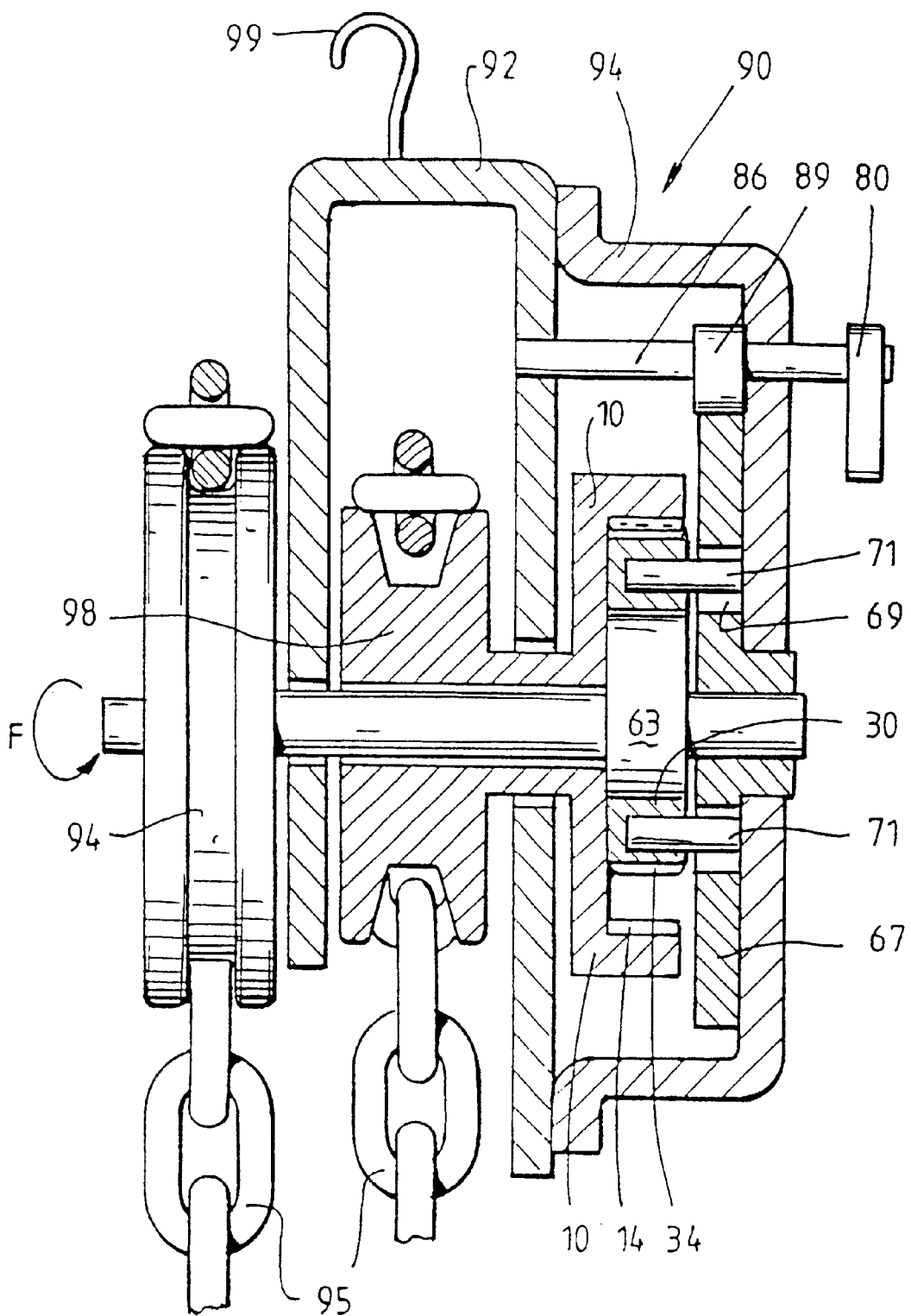
FIG. 16 shows a winch in the form of a hoist utilising the transmission of FIGS. 12 and 13.

FIG. 16 shows a winch generally in the form of a hoist embodying a transmission of the type shown in FIGS. 12 and 13. With reference to FIG. 16, hoist 90 is provided with outer casing parts 92 and 94. Input shaft 64 is provided with integral eccentrics 63 as previously described. The input shaft 64 also carries an input pulley 94 with which is engaged a chain 95 of the hoist 90. Inner gear 30 is mounted on the eccentric 63 in the manner described with reference to FIGS. 12 and 13 and is restrained for orbital motion by pins 71, which locate in holes 69 in orbit control plate 67. Brake mechanism 80 holds orbital control plate 67 stationary.

In this embodiment, the brake mechanism 80 comprises a shaft 86 on which is mounted a pawl 89 which is used to lock the control plate 67 stationary when load is applied so that the brake can not be disengaged when the hoist is loaded. In order to release the brake mechanism 80, load must be taken off the hoist before the pawl can disengage from the control plate 67. The control plate 67 includes teeth (not shown) for receiving the pawl so as to properly engage the pawl 89 with the teeth on the periphery of the control plate. In order to release the plate 67, the shaft 86 can be rotated to withdraw the pawl 89 away from the teeth (not shown) on the periphery of the plate 67 to thereby let the plate rotate as has been previously described.

Outer gear 10 is arranged about the inner gear 30 in the same manner as described with reference to FIGS. 12 and 13 and the output gear 10 has provided on it an output pulley 98. The output pulley 98 receives chain 95 which extends from the input pulley 94.

The casing 92 may include a hook 99 for suspending the hoist 90 so that a suitable load can be connected to the chain 95 extending from the output pulley 98.

By pulling on the chain 95 which extends over the front of the input pulley 94 and which cannot be seen in FIG. 16, the input pulley 94 is rotated in the direction of arrow F to in turn cause eccentric 63 to rotate so as to cause gear 30 to orbit as has been previously described. Orbital motion is transmitted from the gear 30 to the outer gear 10 so that the outer gear 10 rotates about the axis of the shaft 64 to in turn rotate the output pulley 98 so that a load connected to the chain 95 can be lifted.

By simply releasing the chain 95 so as to stop rotation of the input pulley 94 and input shaft 64, the load 95 will remain suspended with the transmission formed by the gears 30 and 10 merely remaining stationary until the chain 95 is again pulled to continue lifting movement. Even though a load is applied to the chain 65, the load will not cause the gearbox to turn because of the eccentric 63 on which the gear is mounted. If it is desired to slightly lower the load, then the chain 95 shown in FIG. 16 which extends over and behind the input pulley 94 can be pulled so that the gearbox rotates in the opposite direction to lift the load on the chain 95 which extends over the output pulley 98. As previously described, the brake 80 cannot be released while the hoist is loaded because of engagement of the pawl 89 with the teeth (not shown) on the periphery of the plate 67 which maintains the plate 67 stationary and locked whilst the hoist is loaded. If it is desired to release the plate 67, the load must be removed to enable the pawl 89 to be disengaged from the teeth (not shown) on the periphery of the plate 67. This prevents the possibility of the gearbox being released and placed in neutral while the hoist is loaded, which would merely cause the weight taken by the hoist to drop under gravity which would be extremely dangerous.

In the embodiments described with reference to FIGS. 12 to 16, the orbit control is provided by a plate 67 which includes openings which receive pins extending from the gear 10 or 30 which is mounted on the eccentric 63. However, in other embodiments the arrangements could be opposite to that which is shown with the pins being provided on the plate 67 and being received in openings formed in the gear 10 or 30 as the case may be.

Figure 17:
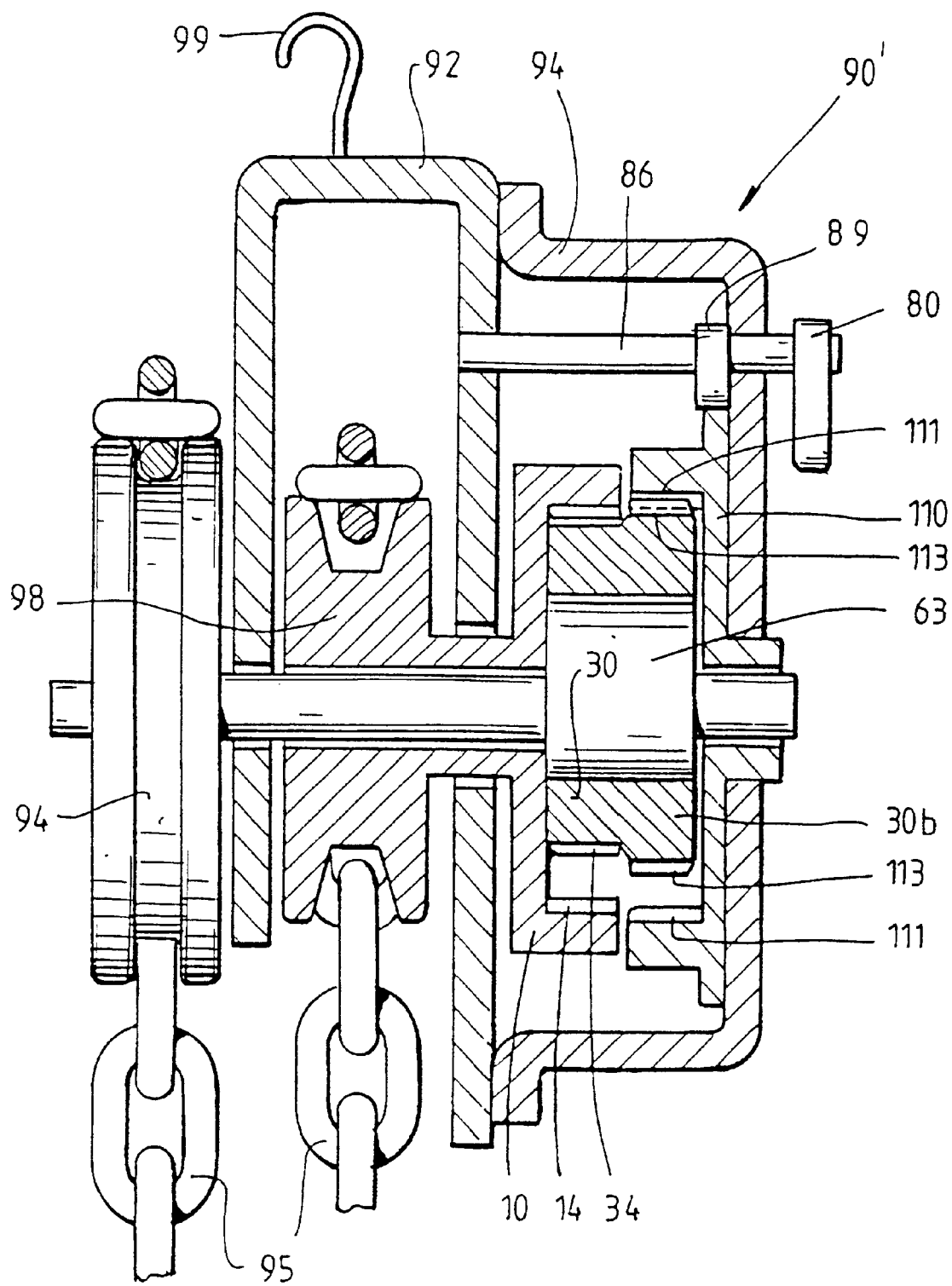
FIG. 17 shows a second embodiment of the hoist of FIG. 16.

FIG. 17 shows an embodiment similar to FIG. 16 but in which the orbit control plate 67 is replaced by a regressive control gear 110. Regressive control gear 110 has teeth 111 which engage with control teeth 113 provided on an extension 30b of the inner gear 30. The inner gear 30 carries the teeth 34 which engage with the teeth 14 of outer gear 10 in the same manner as previously described. The remainder of the hoist 90' shown in FIG. 17 is the same as that described with reference to FIG. 16.

The regressive control gear 110 is maintained stationary by the brake 80 in a similar manner as to that previously described and restricts the gear 30 to undergo orbital motion as the eccentric 63 rotates. The orbital motion is transmitted to the gear 10 which causes the gear 10 to rotate about the axis of the input shaft 64 to rotate the output pulley 98 as previously described.

Once again, in order to place the transmission into neutral, the brake 30 can be released so as to move the cam 89 out of engagement with the gear 110 so the gear 110 is free to rotate so the gear 10 rotates with the eccentric 63 rather than undergoes orbital motion so no drive is supplied to the outer gear 10.

The use of a regressive control gear provides extremely large reductions in ratio by virtue of the fact that the input gear 30 is able to rotate in one direction such as a forward direction with respect to the regressive control gear 110 whilst the gear 10 rotates in the opposite direction so that the ratios between the gear 30 and the regressive control gear 110 and ratio between the inner gear 30 and outer gear 10 effectively multiply to provide an enormous reduction in power from the input shaft 64 to the outer gear 10.

FIG. 18 shows a deck winch for a yacht which utilises the orbital gear transmission according to FIGS. 14 and 15.

Once again, like reference numerals to those used in FIGS. 14 and 15 are used in FIG. 18.

In the embodiment of FIG. 18, input shaft 64 is mounted for rotation on mast 75 and is held in place by a nut 115. A winch handle (not shown) can be engaged with the input shaft 64 to provide rotation to the input shaft 64. Gear 30 which provides output drive in this embodiment is coupled to winch drum 120 by a ratchet 122. The winch drum 120 is also directly coupled to the input shaft 64 by a ratchet 121 which is arranged in reverse with respect to the ratchet 122.

Thus, when the input shaft 64 is rotated in a first direction by the winch handle (not shown) drive can be directly transferred via ratchet 121 to the drum 120 to rotate the drum with a 1:1 ratio with respect to the input shaft 64 and with the ratchet 122 being overrun so that no drive is transmitted from the gear 30 to the winch drum 120. When the input shaft 64 is rotated in the opposite direction, the ratchet 121 freewheels and the ratchet 122 engages so that drive is transmitted from the gear 30 by the ratchet 122 to the winch drum 120 to drive the winch drum with a reduction set by the ratio of the transmission formed by the outer gear 10 and the inner gear 30. As described with reference to FIGS. 14 and 15, the gear 30 rotates in the opposite direction to the input shaft 64 so that when the input shaft 64 is rotated in the opposite direction to that which causes drive to be transmitted directly through the ratchet 121, the drum 120 will nevertheless rotate in the same direction as the aforementioned direction so that the drum 120 always rotates in the same direction either with a 1:1 ratio or with a ratio as set by the transmission formed by the orbital gear transmission formed by the gears 10 and 30.

Although not shown, bearings may be provided between the input shaft 64 and the mast 75 and also between the input shaft 64 and the gear 30 for supporting relative rotation of those components.

The base plate 71 may also support a rope guide 123 for guiding rope onto and/or off the drum 120.

The drum 120 may also be provided with bearings from supporting rotation of the drum 120 relative to the shaft 64 and support surface 108 of the guide 123.

In the embodiments described, one of the inner gear 30 or outer gear 10 is mounted for rotation on a shaft and the other gear is restrained for orbital motion. In these systems, unlike spur gear systems or the like, where contact is basically tangential between gear teeth, contact and engagement is radial. Rotary motion is transferred by virtue of the cyclic orbital movement of the orbiting gear.

Furthermore, whilst in the embodiments described, only one of the gears is controlled for orbital motion, embodiments could be provided in which both the inner gear 30 and outer gear 10 are arranged for orbital motion. In such an embodiment, engagement of the respective teeth of the inner and outer gears takes place at the intersection of the cycloids. Double orbital arrangements of this nature are disclosed in our copending Australian Patent Application No. PO3739, the contents of which is incorporated herein by this reference.

Since modifications within the spirit and scope of the invention may readily be effected by persons skilled within the art, it is to be understood that this invention is not limited to the particular embodiments described by way of example hereinabove.

What is claimed is:

1. An orbital gear system, including:

an inner gear and an outer gear;

the inner gear having a plurality of external teeth, the plurality of external teeth having a contact surface and a opposite surface, the inner gear having a pitch circle, the contact surface having a point of inflection located on the pitch circle of the inner gear;

the outer gear having a plurality of internal teeth for engagement with the external teeth of the inner gear, the inner teeth having a contact surface for engaging the contact surface of the external teeth of the inner gear, the outer gear having a pitch circle; and wherein, when the inner gear and outer gear are assembled for transmission of power from one of the gears to the other of the gears, the inner and outer gears undergo substantially radial engagement and point contact with the point of inflection of the external teeth engaging and rocking over only a point on the contact surface of the internal gear substantially where the pitch circle of the outer gear intersects the contact surface of the outer gear.

2. The orbital gear system according to claim 1, wherein the contact surface has a sinusoidal profile.

3. The orbital gear system according to claim 2, wherein the sinusoidal profile is defined by the following equation:

$$y = f(D) \mathrm{Sin}\{\pi W D \Theta g(\epsilon)\}$$

Where D is the diameter of the pitch circle

W is tooth width $\epsilon$ is eccentricity $\Theta$ angular displacement within the constraint the D of the inner gear is more than two thirds the D of the outer gear.

4. The orbital gear system of claim 2, wherein the external teeth of the inner gear are truncated having a generally flat outermost surface and the sinusoidal portion of the contact surface extends from a point radially inwardly of the pitch circle of the gear to the truncated surface.

5. The orbital gear system of claim 2, wherein the opposite surface of the external teeth are also provided with a sinusoidal profile along at least a part of the length of the opposite surface, the sinusoidal profile of the opposite surface having a point of inflection located on the pitch circle of the gear, so that the gear can operate in both forward and reverse directions with the contact surface making contact with the internal teeth of the outer gear in one direction and the opposite surface effectively becoming the contact surface for rotation in the opposite direction.

6. The orbital gear system of claim 1, wherein the contact and opposite surfaces of the external teeth are a mirror image with respect to one another.

7. The orbital gear system of claim 1, wherein the contact surface of the internal teeth is an inclined flat surface which extends from a radially outer point to the point where the pitch circle of the outer gear intersects with the contact surface.

8. The orbital gear system of claim 2, wherein the angle of the flat surface with respect to the radius of the outer gear is determined by the derivative of the sinusoid forming the sinusoidal profile of the external teeth at the point of inflection of the sinusoidal profile.

9. The orbital gear system of claim 1, wherein the contact surface of the internal teeth extends radially inwardly from the point of intersection of the contact surface and the pitch circle of the outer gear to a radially most inner point of the internal teeth.

10. The orbital gear system of claim 1, wherein the internal teeth have a opposite surface which is a mirror image of the contact surface with the opposite surface becoming the contact surface in reverse motion of the gear system.

11. A rotary transmission mechanism, including:

a first body having contact elements;

a second body having contact elements for engaging the contact elements of the first body and transferring rotary motion from the first body to the second body;

one of the first body or second body being arranged for orbital motion relative to the other of the first or second body; and the elements of the first body and second body in contact with one another, when rotary motion is transferred, execute cupsoid cycloidal motion with respect to each other and engage radially by a rocking motion on substantially a point of a surface of the other of the elements.

12. The rotary transmission mechanism of claim 11, wherein the surface is a sinusoidal surface, the sinusoidal profile being defined by the following equation:

$$y = f(D) \sin\{\pi W D \Theta g(\epsilon)\}$$

Where D is the diameter of the pitch circle

W is tooth width $\epsilon$ is eccentricity $\Theta$ angular displacement within the constraint the D of the inner gear is more than two thirds the D of the outer gear.

13. An orbital gear system according to claim 1, wherein the inner gear and the outer gear have a pitch circle diameter (PCD) ratio of about 93%.

14. A rotary transmission mechanism according to claim 11, wherein the first body and the second body are gears and have a pitch circle diameter (PCD) ratio of about 93%.

* * * * *